Jan. 31, 1950    M. DUPEYRON, NEE JUNCA    2,496,165
TELESCOPIC STAND FOR PHOTOGRAPHIC CAMERAS
Filed Aug. 30, 1946
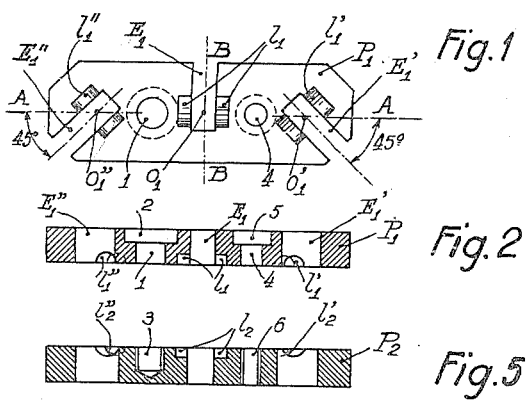
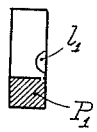
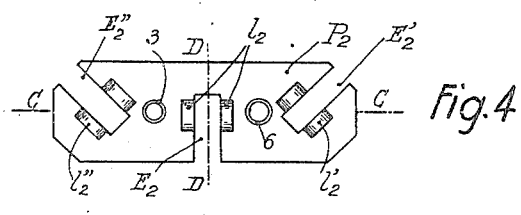
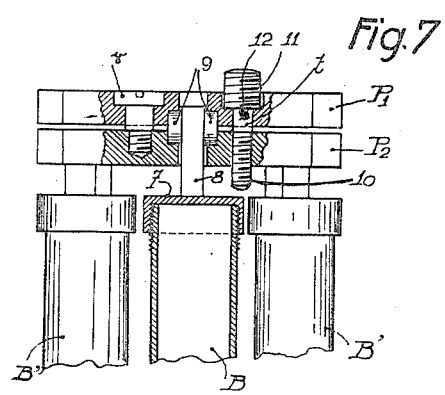
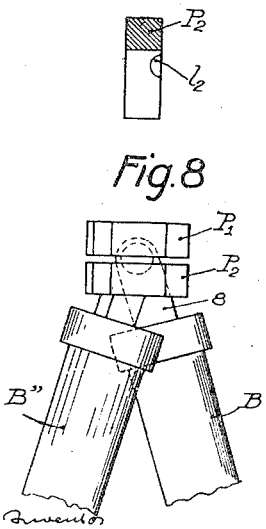
MADELEINE DUPEYRON NEE JUNCA Patented Jan. 31, 1950

2,496,165

UNITED STATES PATENT OFFICE 2,496,165

TELESCOPIC STAND FOR PHOTOGRAPHIC CAMERAS

Madeleine Dupeyron, nee Junca, Paris, France

Application August 30, 1946, Serial No. 693,981
In France November 6, 1944

Section 1, Public Law 690, August 8, 1946
Patent expires November 6, 1964

1 Claim. (Cl. 248—191)

My invention relates to improvements in or relating to telescopic stands for photographic cameras and more particularly a stand provided with a flat reversible head itself provided on one of its faces with an externally threaded rod with the so-called "congress" pitch and on the other face with an externally threaded rod with the so-called "kodak" pitch.

The flat reversible head according to my invention is characterized in that it comprises in combination two superimposable thin plates of a rectangular shape adapted to engage with two of their long faces half-cylindrical recesses provided in said faces so as to be superimposed and to form cylindrical recesses adapted for receiving cylindrical axes perpendicular to each one of the legs with which they are integrally formed, openings provided in said plates perpendicularly to said recesses in order to permit the legs of swinging about their respective axes and means making it possible to insure between each one of the swinging axes and both corresponding half-cylindrical recesses a friction which is sufficient for insuring a satisfactory stability of the legs in each position of the same.

According to another feature of my invention the recess of the middle swinging axis admits for its plane of symmetry the longitudinal plane of symmetry of the plate, the corresponding opening being formed of a slot which is perpendicular to said plane and opens onto one of the long sides of the plate while the recesses of both side swinging axes are arranged symmetrically to the swinging plane of the middle axis, both corresponding openings being formed of two slots which are perpendicular to the planes of symmetry of each recess respectively and opening onto a side of the plate different from that corresponding to the middle slot.

Another feature of my invention consists in that each swinging plane of both side legs forms with the swinging plane of the middle leg an angle which can practically vary from 45° to 60°.

According to a preferred form of execution of my invention the points of intersection of each swinging axis with the corresponding swinging plane lie on a straight line which preferably coincides with the longitudinal axis of the plate.

An embodiment of my invention is shown by way of example in the accompanying drawing in which:

Figure 1 is a bottom plan view showing the upper plate of a flat reversible head according to the invention.

Figures 2 and 3 are respective sectional views through lines A—A and B—B of Figure 1.

Figure 4 is a top plan view showing the associated lower plate.

Figures 5 and 6 are respective sectional views through lines C—C and D—D of Figure 4.

Figure 7 is a partial elevational view with parts in sectional view showing a stand according to my invention in the position of rest, and Figure 8 is a partial side view showing the three legs swung apart.

The telescopic stand shown in the appended drawing comprises a flat reversible head formed of two superimposable plates $P_1$, $P_2$ of a rectangular shape with cut off angles. In each of said plates three notches are provided: one of which or the middle notch is perpendicular to the length axis of the plate and designated by $E_1$, $E_2$ while both other notches $E'_1$, $E''_1$ and $E'_2$, $E''_2$ are arranged symmetrically with respect to the first one and open into the angles opposed to the side onto which the middle notch opens. In the example shown the plane of symmetry of each of the side notches forms an angle of 45° with the longitudinal plane of symmetry of the plate; in fact, said angle can vary and it will preferably be chosen between 45° and 60°.

Into each notch open two symmetrical half-cylindrical recesses $l_1$, $l_2$, $l'_1$, $l'_2$, $l''_1$, $l''_2$ the axis of which is perpendicular to the plane of symmetry of each notch.

The points of intersection of each theoretical swinging axis with the corresponding swinging axis lie, in the example shown, in the longitudinal plane of symmetry of the plate. This condition is by no way limitative and my invention also covers cases in which said points would lie on a broken line.

Furthermore, the plate $P_1$ is provided with two cylindrical holes 1 and 4 opening into holes 2 and 5 having a larger diameter, internally threaded holes 5 and 6 provided in the plate $P_2$ corresponding to said holes 1 and 4.

The telescopic stand proper comprises three legs B, B', B'' formed of a series of successive elements telescopically sliding in one another in a known manner. The element having the largest diameter is screwed into an externally threaded cap 7 (Figure 7) integrally formed with a carrier 8 perpendicular to its bottom and carrying in its upper part either two half-cylindrical axes 9 or a single axis similarly projecting on both sides of the carrier and perpendicular to the latter.

Each one of said axes is maintained in both corresponding half recesses of the upper and lower plates by a screw $v$ with a countersunk head (Figure 7) and by a pin $t$ threaded at 10 with the "kodak" pitch and at 11 with the "congress" pitch and secured by a cross screw 12. The clamping pressure is such that the rubbing of the axes of rotation on the corresponding bearing surfaces insures a satisfactory stability in each position.

Moreover, the preceding fastening method is by no way limitative and could be substituted by any equivalent arrangement. It would be possible, more particularly, to use two screws with a countersunk head, said screws being threaded one with the "congress" pitch and the other with the "kodak" pitch and each of them freely passing through one of the plates and being screwed across the other so as to offer a satisfactory projection.

The reversibility of the head is obtained by causing the axes 9 to swing by 180° in their bearings said movement being rendered possible owing to the presence of the notches opening onto the sides of each plate. In the position of rest the legs B, B', B'' come to lie side by side (Figure 7) the space required by the whole being a minimum. In the position of use the legs occupy the position shown in Figure 8.

I claim:

In a camera tripod an elongated tripod head composed of two elongated superimposed tripod head plates; one middle and two side pairs of corresponding recesses in the facing surfaces of said elongated superimposed tripod head plates, said middle pair of corresponding recesses arranged substantially in direction of the longitudinal axis of the same and each of said two side pairs of corresponding recesses arranged near one of the ends of said elongated tripod head forming an angle of between 45 and 60 degrees with said longitudinal axis of said elongated tripod head; three pivoting pins each arranged in one of said pairs of recesses; three slots in said elongated tripod head extending normal to said facing surfaces of said elongated superimposed tripod head plates and each of said slots passing through one of said pairs of corresponding recesses normal to the axis thereof; three attaching means for the tripod legs each arranged in one of said slots attached to the corresponding pivot pin turnably about at least 180 degrees; and means for holding said superimposed elongated tripod head plates together.

MADELEINE DUPEYRON, NEE JUNCA.

REFERENCES CITED

The following references are of record in the file of this patent:

UNITED STATES PATENTS

| Number | Name | Date |
|---|---|---|
| 2,229,473 | Redmer | Jan. 21, 1941 |

FOREIGN PATENTS

| Number | Country | Date |
|---|---|---|
| 75,674 | Switzerland | Sept. 1, 1917 |
| 270,592 | Great Britain | May 12, 1927 |
| 295,055 | Great Britain | Aug. 14, 1928 |